July 19, 1966  C. H. KELLER  3,262,004
FLASH DEVICE
Filed March 19, 1963
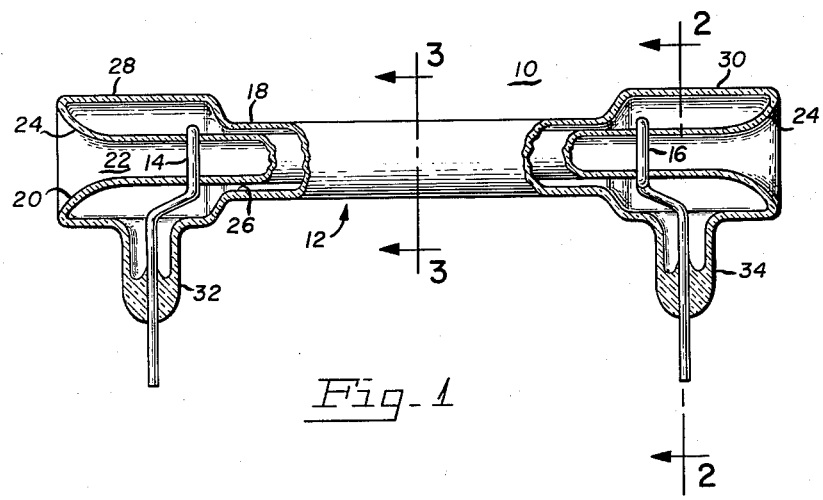
Fig-1
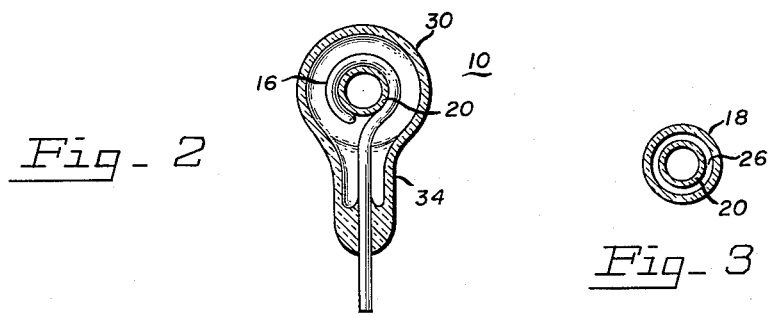
Fig-2
Fig-3
INVENTOR.
CHARLES H. KELLER
BY
ATTORNEY United States Patent Office 3,262,004
Patented July 19, 1966

3,262,004
FLASH DEVICE
Charles H. Keller, Sunnyvale, Calif., assignor to Pek Labs, Inc., Sunnyvale, Calif., a corporation of California
Filed Mar. 19, 1963, Ser. No. 266,303
8 Claims. (Cl. 313—220)

This invention relates to flash devices and more particularly to a flash lamp having a tubular cavity which is substantially uniformly illuminated along its active length.

Conventional flash lamps or similar devices usually provide a point or line source of intense illumination which, either directly or by means of reflectors, illuminates a desired area, space or object. Such flash lamps may be highly suitable for flash photography, stroboscopic illumination and like applications involving the illumination of areas and large objects, but have been found inefficient if used for the illuminating of small objects, particularly where uniform illumination from all sides is desired.

Particularly with the advent of lasers (light amplification by stimulated emission of radiation) which require light to pump up the energy state of the electrons, efficient optical coupling of a flash lamp to the laser is most desired. Most lasers, such as for example a Ruby laser, are usually shaped in the form of a cylinder with a transparent wall and silvered end faces. Pumping is accomplished by radiating light from a flash tube through the transparent wall. For efficient coupling, the prior art has devised a flash tube in the form of a coil of many turns into which the laser is axially inserted. Even though such illumination provides a more efficient coupling than line or point sources of light, the optical coupling efficiency is still not as high as desired.

It is accordingly a primary object of this invention to provide a new and improved flash lamp which is constructed for more efficient optical coupling with an elongated object. The shape of the object to be illuminated may be of a variety of cross-sectional shapes such as circular, triangular, square or irregular.

It is a further object of this invention to provide a flash device having a cavity so that the object to be illuminated can be inserted therein for best optical coupling.

It is still another object of this invention to provide a flash device particularly suited for pumping a cylindrically-shaped laser material with optimum optical coupling efficiency.

It is a still further object of this invention to provide an intense tubular light source which is substantially uniform along its length and which has a cavity located inside the light source for accommodating the object to be illuminated.

Other objects and a better understanding of the invention may be had by reference to the following description, taken in conjunction with the accompanying drawings, in which:

FIG. 1 is an elevational side view with certain portions cut away to show details of the configuration of the flash device of this invention;

FIG. 2 is a sectional view taken along line 2—2 of FIG. 1; and

FIG. 3 is a sectional view taken along line 3—3 of FIG. 1.

As is well known in the art, flash lamps comprise generally an anode and a cathode sealed in a glass or quartz envelope, typically of cylindrical configuration in case of line sources, containing a relatively low pressure atmosphere such as Xenon. The anode and cathode are separated by a distance approximately equal to the desired luminous length of the line source to produce an intense flash discharge which is started by a high voltage pulse from a suitable power supply. Both the minimum voltage of the starting pulse necessary for partial ionization of the gas to initiate a flash discharge, as well as the maximum permissible energy of starting power, depend on the flash lamp geometry and conductive portions of the current path.

Referring now to the drawing, in which like reference characters designate like parts, there is shown a flash lamp 10 constructed in accordance with this invention. Lamp 10 includes a sealed tubular envelope and a pair of electrodes 14 and 16. Envelope 12 comprises a pair of concentrically spaced tubular members 18 and 20 which respectively form its outer and inner wall and which are constructed of quartz for well understood reasons. Inner tubular member 20 is of substantially uniform cross section throughout the major portion of its length defining a bore or cavity 22, and having end portions slightly flared in an outward direction at 24 to facilitate sealing of the envelope.

Outer tubular member 18 has a mid section of substantially uniform cross section along its length with its inner diameter selected to provide a preselected radial gap 26 between the outer surface of inner tubular member 20 and the inner surface of outer tubular member 18. The end portions of outer tubular member 18 are enlarged, as shown at 28 and 30, primarily to provide space for accommodating electrodes 14 and 16 and to facilitate sealing the rim of flared end portions 24 to the rim of end portions 28 and 30 to provide a sealed envelope. End portions 28 and 30 are provided with stem portions 32 and 34 extending transversely to the major axis of envelope 12.

Electrodes 14 and 16 respectively form the anode and cathode and have a ring-shaped portion forming the arc ends and a rod portion forming the current connecting part and support means. The electrodes are normally constructed of a refractory metal such as tungsten and are preferably of single piece construction. As illustrated, the ring-shaped arc end is disposed concentrically with bore 22 within the space between inner tubular member 20 and end portions 28 and 30 respectively. The rod portions of electrodes 14 and 16 are supported by and sealed in the ends of stem portions 32 and 34 respectively. In the preferred embodiment of this invention, the ring-shaped portions of electrodes 14 and 16 should be as close as possible to tubular gap 26 to facilitate the partial ionization and discharge when energy is applied thereto. Since stem portions 32 and 34 are usually spaced from the neck defining the beginning of tubular gap 26, the rod-like portion of the electrode is usually angled towards one another to bring the arc ends of the electrodes closer to the neck.

The following dimensions were found suitable for a typical flash lamp, constructed in accordance with this invention for pumping a laser crystal having a diameter of one inch and a tubular length just below 4 inches. The mid portion of outer tubular member 18 may have an outside diameter of 38.5 mm. (millimeters) and an inside diameter of 35 mm. Inner tubular member 20 may have an outside diameter of 30 mm. and an inner diameter of 27 mm. Accordingly, the radial separation defining gap 26 is 5 mm. The outside diameter of enlarged end portions 28 and 30 may have 48 mm. and their axial length 2½ inches.

Since the spacing between electrodes 14 and 16 determine the active length, required to be in excess of 4 inches since the length of the object is 4 inches, the uniformly cross sectioned center portion of inner tubular member 20 has an axial length of 3¾ inches, allowing for about 3/16 to ¼ inch between the neck of gap 26 and the arc end of the electrodes. The tube constructed with these dimensions has been found to require a flashing voltage of about 4,000 volts with a maximum permissible energy input of about 600 watt seconds so as to limit the peak current of 2,000 amperes for a tungsten rod electrode having a diameter of 0.060 inch.

In operation, the laser crystal or object to be illuminated is placed into cavity 22 and laterally positioned so that the portion to be illuminated is conextensive with the active length of tube 10, that is, coextensive with the portion between electrodes 14 and 16. Electrical energy is applied to the rod-like portions of electrodes 14 and 16 to initiate a discharge which takes the form of a hollow cylindrical flash having a wall thickness and mean diameter determined by radial width and mean diameter of gap 26. In this manner, one half of the available illumination is directly and efficiently coupled to the laser or other like object to be illuminated.

For greater efficiency of coupling, the outer peripheral surface, along the active length of tubular member 18, may be silvered so that a substantial portion of the light is reflected inwardly to add its energy to illuminating the laser. Also in certain embodiments of this invention outer tubular member 18 may be of opaque material for greater structural strength and may have an internally reflecting surface. There are a number of modifications which can be made in accordance with the teachings herein without departing from the invention disclosed. For example, members 18 and 20 may be of any type of cross section such as square, triangular, oval, rectangular, or cross sections of more sides than four. For most efficient optical coupling, the cross section of the cavity is usually selected to be substantially the same as the cross section of the body to be illuminated.

There has been described a flash lamp having a cavity shaped to conform to and to house the body to be illuminated. The cavity assures a very efficient optical coupling between a light source and a body to be illuminated.

What is claimed is:

1. A low pressure discharge device comprising: an elongated envelope having an elongated cavity, said envelope being formed of an outer and inner tubular member having opposite ends sealed to one another to define an elongated space therebetween suitable for pressurizing, the inner bore of said inner tubular member defining said elongated cavity open at least at one end; a pair of ring-shaped electrodes disposed in said space and substantially surrounding said inner tubular member and spaced from each other a selected distance defining the active length of said device; and conductor means connected to said electrodes and sealed to said envelope for applying electrical energy to said electrodes to produce a flash upon discharge extending through said active length.

2. A discharge device comprising:
a longitudinally extending inner tubular member;
a longitudinaly extending outer tubular member disposed in surrounding relationship with said inner tubular member, said outer member including a tubular center portion and an enlarged tubular end portion at each end thereof, each enlarged tubular end portion having a branch portion, opposite ends of said inner and said outer member being sealed to one another to form a sealed tubular envelope; and
a pair of spaced, ring-shaped electrodes disposed between said inner and the enlarged portion of sealed outer member and carried by said branch portions.

3. A gaseous discharge device comprising:
a longitudinally extending inner tubular member of substantially constant cross section along its length;
a longitudinally extending outer tubular member disposed in surrounding relationship with said inner tubular member, said outer member including a tubular center portion of substantially constant cross section along its length and an enlarged tubular end portion at each end thereof, each enlarged tubular end portion having a branch portion extending transversely therefrom, opposite ends of said inner and said outer member being sealed to one another to form a sealed tubular envelope;
a pair of spaced, ring-shaped electrodes disposed between said inner and the enlarged portion of said outer member and carried by said branch portions; and
current conductor means connected to said electrodes and sealed to said branch portions for applying high voltage energy to said electrodes to initiate a flash discharge therebetween.

4. A gaseous discharge device comprising:
a longitudinally extending inner member having a bore therethrough of substantially constant cross section along its length, said bore being dimensioned to receive an object to be illuminated;
a longitudinally extending outer tubular member disposed in surrounding relationship with said inner member and concentric with the axis of said bore, said outer member including a tubular center portion of substantially constant cross section along its length to define a selected radial space with the outer peripheral surface of said inner member and enlarged tubular end portions, said enlarged tubular end portions having branch portions extending transversely therefrom, opposite ends of said inner and said outer member being sealed to one another to form a sealed tubular envelope surrounding said bore;
a pair of spaced, ring-shaped electrodes disposed between said inner and the enlarged portion of sealed outer member carried by said branch portions; and
current conductor means connected to said electrodes and sealed to said branch portions to initiate a flash discharge of tubular shape for illuminating the section of said bore lying between said electrodes.

5. A gaseous discharge device comprising: a sealed tubular envelope having a substantially cylindrical bore extending therethrough and dimensioned for accommodating an elongated object to be illuminated; and a pair of spaced ring-shaped electrodes disposed within said tubular envelope and coaxial with said bore, the distance of separation of said electrodes defining the active length of said device being greater than the length of the object to be illuminated.

6. A gaseous discharge device in accordance with claim 5 in which said sealed envelope includes enlarged outer end portions having branch portions extending therefrom transversely and in which conductive members are connected to said electrodes and sealed to said branch portions to support said electrodes and to provide a current path between said electrodes and a power supply.

7. A gaseous flash device comprising:
an inner tubular member of substantially uniform cross section having a major axis;
an outer tubular member having a reduced center portion and a major axis, said outer member being disposed with its major axis lying along the major axis of said inner member, opposite end portions of said inner member being sealed to opposite end portions of said outer member to form a sealed tubular envelope having an open inner bore for receivement of an object to be illuminated;

a pair of spaced ring-shaped electrodes in the space between said inner and outer member and outside said reduced center portion and well inwards of the sealed ends of said envelope, the axes of said electrodes overlying said major axis; and means in the peripheral wall of said outer member to carry said electrodes and to provide a current path thereto.

8. A flash device in accordance with claim 7 in which the outside peripheral surface of said reduced center portion is silvered to reflect illumination from said space inwardly towards said bore.

References Cited by the Examiner

UNITED STATES PATENTS

| | | | |
|---|---|---|---|
| 2,225,439 | 12/1940 | Arens | 313—110 |
| 2,304,657 | 12/1942 | Ronci | 313—110 |
| 2,314,096 | 3/1943 | Leverenz | 313—110 |
| 2,457,503 | 12/1948 | Singer | 313—109 |
| 2,842,712 | 7/1958 | Muldoon | 315—39 |
| 3,159,707 | 12/1964 | Bennett | 331—94.5 |

DAVID J. GALVIN, *Primary Examiner.*

GEORGE N. WESTBY, *Examiner.*

S. D. SCHLOSSER, *Assistant Examiner.*